US008250189B1

(12) United States Patent
Breau et al.

(10) Patent No.: US 8,250,189 B1
(45) Date of Patent: Aug. 21, 2012

(54) EMPLOYING IP VERSION FIELDS TO DETERMINE DATA-LINK LAYER ADDRESSES

(75) Inventors: Jeremy R. Breau, Kansas City, MO (US); John H. Bennett, III, Lawrence, KS (US); Frederick C. Rogers, Olathe, KS (US); Joseph Christopher Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 303 days.

(21) Appl. No.: 12/693,793

(22) Filed: Jan. 26, 2010

Related U.S. Application Data

(63) Continuation-in-part of application No. 12/633,571, filed on Dec. 8, 2009, which is a continuation-in-part of application No. 12/437,300, filed on May 7, 2009, now Pat. No. 8,107,475.

(51) Int. Cl.
*G06F 15/177* (2006.01)
(52) U.S. Cl. ........................................ 709/222; 709/245
(58) Field of Classification Search .................. 709/222, 709/238, 245
See application file for complete search history.

(56) References Cited

U.S. PATENT DOCUMENTS

| 2006/0165062 | A1 | 7/2006 | Nishida et al. | |
| 2007/0115967 | A1* | 5/2007 | Vandenberghe et al. | 370/389 |
| 2009/0046599 | A1* | 2/2009 | Pollakowski et al. | 370/254 |
| 2009/0304026 | A1 | 12/2009 | Hamada | |
| 2010/0107162 | A1* | 4/2010 | Edwards et al. | 718/1 |

OTHER PUBLICATIONS

Notice of Allowance and Fees Due in U.S. Appl. No. 12/437,300 mailed Oct. 3, 2011, 10 page.
Office Action mailed Mar. 22, 2011 in U.S. Appl. No. 12/437,300, 25 pages.
"Reverse DNS Lookup", retrieved Apr. 16, 2010, 3 pages, http://en.wikipedia.org/wiki/Reverse_DNS_Lookup.
"Domain Name System", retrieved Apr. 16, 2010, 15 pages, http://en.wikipedia.org/wiki/Domain_Name_System.
"Ax Series: IPv4 & IPv6 Dual Stack", 2005, A10 Networks, 3 pages, http://www.a10networks.com/products/axseries-ipv.php.

(Continued)

*Primary Examiner* — Jason Recek

(57) ABSTRACT

Computer systems, computer-readable media, and computerized methods for determining a media access (MAC) address that corresponds with a network identifier in a wireless or wired network are provided. A dynamic host configuration protocol (DHCP) server is employed to allocate a set of fractional IP addresses that include a common IPv4 address paired with a value of an IP version field, where none of the values overlap. When assigned to a client device, the fractional IP address uniquely identifies the client device within the network. A host device within the network is configured to broadcast an address resolution protocol (ARP) request to other devices within the network, such as the DHCP server, where the ARP request includes a fractional IP address associated with intended recipient(s) of communications from the host device. In response to the ARP request, the appropriate device or DHCP server returns a MAC address of the intended recipient(s).

16 Claims, 11 Drawing Sheets

OTHER PUBLICATIONS

Durand, Alain, "Sharing a Single IPv4 Address Among Many Broadband Customers", pp. 1-9, http://www.nanog.org/mtg-0710/presentations/Durand-lightning.pdf, Jul. 2010.

"IPV4 Address Exhaustion", 7 pages, May 7, 2009, http://en.wikipedia.org/wiki/IPv4_address_exhaustion.

"Network Address Translation", 10 pages, May 4, 2009, http://en.wikipedia.org/wiki/Network_address_translation.

Iljitsch Van Beijnum, "IPv4 Address Consumption", 2009, 5 pages, The Internet Protocol Journal, vol. 10, No. 3., http://www.cisco.com/web/about/ac123/ac147/archived_issues/ipj_10-3/103_addr-cons.html.

"Classless and Subnet Address Extensions", http:triton.towson.edu/~rhammell/Ait622/Chap09_post.ppt#370,1, Classless, Jul. 2010.

* cited by examiner

| HOST TABLE | | | |
|---|---|---|---|
| NAME | MAC | IP ADDRESS | VALUE |
| END ROUTER | 01-02-03-04-08 | 12.14.16.1 | 0001 |
| HOST A | 01-02-03-04-05 | 12.14.16.2 | 0100 |
| HOST B | 01-02-03-04-06 | 12.14.16.3 | 0011 |
| HOST C | 01-02-03-04-07 | 12.14.16.3 | 0100 |
| . . . | . . . | . . . | . . . |

*FIG. 8.*

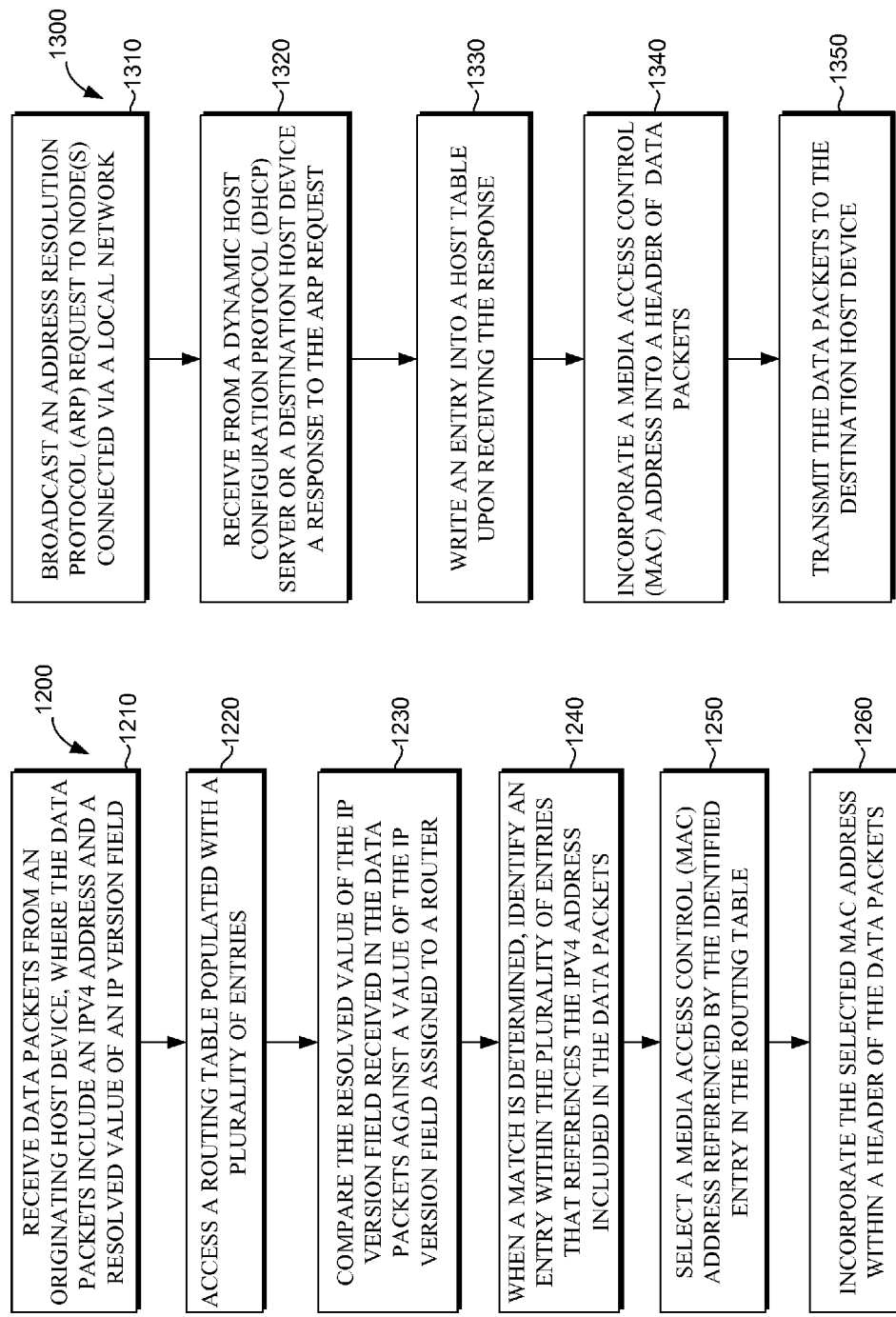

EMPLOYING IP VERSION FIELDS TO DETERMINE DATA-LINK LAYER ADDRESSES

CROSS-REFERENCE TO RELATED APPLICATIONS

This application is a continuation-in-part of prior U.S. application Ser. No. 12/633,571 filed Dec. 8, 2009, entitled "ALLOCATING IP VERSION FIELDS TO INCREASE ADDRESS SPACE," which is a continuation-in-part of prior U.S. application Ser. No. 12/437,300 filed May 7, 2009, entitled "METHOD AND PROCEDURE FOR INCREASING IPV4 ADDRESS SPACE." The teachings of U.S. application Ser. Nos. 12/633,571 and 12/437,300 are hereby incorporated by reference in their entirety.

BACKGROUND

Communication among computing devices typically occurs through networks. For computing devices in a wired network to communicate, each device must have a unique network identifier. In packet-switched networks, each network device is assigned an internet protocol (IP) address to identify the particular device in the network.

The dominant standard for IP addresses is internet protocol version four (IPv4). IPv4 addresses are 32 bits in length, which limits the possible number of IPv4 addresses available for use to 4,294,967,296 ($2^{32}$). As the number of client devices seeking network connections continues to grow, the number of available IPv4 addresses continues to decline and will eventually reach zero. This problem is known as IPv4 address exhaustion. Although estimates of the approximate date of IPv4 address exhaustion vary, it is widely recognized that IPv4 addresses will eventually be exhausted.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate to systems and methods for assigning unique network identifiers in a wired or a wireless network and using the network identifiers to determine a data-link layer (layer 2) address of a particular device, such as an intended recipient of a communication. The systems and methods facilitate assigning a unique network identifier (fractional IP address), which typically include an IPv4 address and a particular value of an IP version field, to a host device that is active on the network. As used herein, the "fractional" IP address represents a specific unique network identifier that is composed of, in part, the IPv4 address assigned to the client device along with a portion, or fraction, of a header used in addressing data packets. In an exemplary embodiment, the fraction of the header is a value entered into an IP version field, such as one of IPv0-Ipv4. Utilizing this version-based, fractional IP address allows for the assignment of many fractional IP addresses, which are unique amongst themselves, to multiple client devices that are active on the same network and that are using the same IPv4 address. Because each fractional IP address includes one of various available values of the IP version field in addition to the IPv4 address, the usefulness of a single IPv4 address is extended from one client device to multiple client devices.

Upon assigning these fractional IP addresses to various client devices within the wired or wireless network, the client devices may communicate among each other using the fractional IP addresses. In an exemplary embodiment, a host device that is preparing to initiate a communication (i.e., originating host device) may identify a name of a host device to target as the recipient of the communication (i.e., destination host device). The originating host device may then determine the destination host device's network layer (layer 3) address, or IPv4 address, by conducting a resolution process. In instances, the originating host device utilizes a domain name system (DNS) lookup to perform the resolution operation that translates the name of the destination host device to an IPv4 address and a value of an IP version field that are utilized to convey the communication. In an exemplary embodiment, the value of the IP version field is represented by a four-bit indicator that typically indicates one of IPv0, IPv1, IPv2, IPv3, or IPv4.

This resolved IPv4 address in conjunction with the value of the IP version field correspond to a particular fractional IP address within a local network, such as an enterprise network. In one embodiment, this fractional IP address has been previously assigned to the destination host device using an allocation process, discussed more fully below. Once the fractional IP address is known to the originating host device, the originating host device broadcasts a request message that includes the fractional IP address to a plurality of host devices and other nodes connected via the local network. The general intent of the request message is to acquire the data-link layer address, or media access control (MAC) address, of the destination host device and to use the MAC address to route data packet(s) thereto.

Upon receiving the request message, the host devices in the local network may access the fractional IP address carried in the request message and compare the accessed fractional IP address against the fractional IP address assigned to each of the host devices. Of the host devices that receive the request message, the destination host device will likely ascertain that the accessed fractional IP address matches its previously assigned fractional IP address. Accordingly, just the destination host device may response to the originating host device with a confirmation of the match and an indicia of the MAC address assigned to the destination host address.

Upon receiving the response from the destination host device, the originating host device is configured to write an entry into a host table that includes MAC address mapped to the fractional IP address assigned to the destination host device. In one embodiment, when the originating host device constructs the data packets to transmit to the destination host device, the originating host device reads the host table to determine the MAC address of the destination host device and incorporates the MAC address into a pre-designated portion of the header of the data packets. Consequently, the destination host device may properly receive the data packets upon transmission from the originating host device.

In another embodiment, a computer system is provided that includes a server (e.g., dynamic host configuration protocol (DHCP) server) that determines a MAC address of the destination host device upon being solicited by an originating host device. This embodiment essentially eliminates the process of sending request messages to the host devices connected within the local network. Initially, the DHCP server is configured to receive an address resolution protocol (ARP)

request from the originating host device. Typically, the ARP request includes an IPv4 address and a value of an IP version field that were determined during the resolution processed discussed above. Upon identifying the IPv4 address and the value of the IP version field carried in the ARP request, the DHCP server accesses an ARP table that is populated with a plurality of entries. These entries in the ARP table include MAC addresses mapped to both IPv4 addresses and assigned IP-version-field values. The DHCP server then compares the IPv4 address received in the ARP request against the IPv4 addresses in the ARP table to determine a match and compares the value of the IP version field received in the ARP request against the assigned IP-version-field value associated with the IPv4 address that matches the received IPv4 address. When the assigned IP-version-field value associated with the matching IPv4 address is determined to correspond with the value of the IP version field in the ARP request, the DHCP server selects the MAC address mapped to the ascertained IP-version-field value and sends a response that includes the selected MAC address to the originating host device.

BRIEF DESCRIPTION OF THE SEVERAL VIEWS OF THE DRAWINGS

The present invention is described in detail below with reference to the attached drawing figures, wherein:

FIG. 8 is a diagrammatic illustration of an exemplary host table, according to an embodiment of the present invention;

FIG. 12 is a flow chart of an exemplary method for determining a media access control (MAC) address upon being solicited by an originating host device, according to an embodiment of the present invention; and FIG. 13 is a flow chart of an exemplary method a method for routing one or more data packets within a local network based on, in part, a MAC address, according to an embodiment of the present invention.

DETAILED DESCRIPTION

Figure 1:
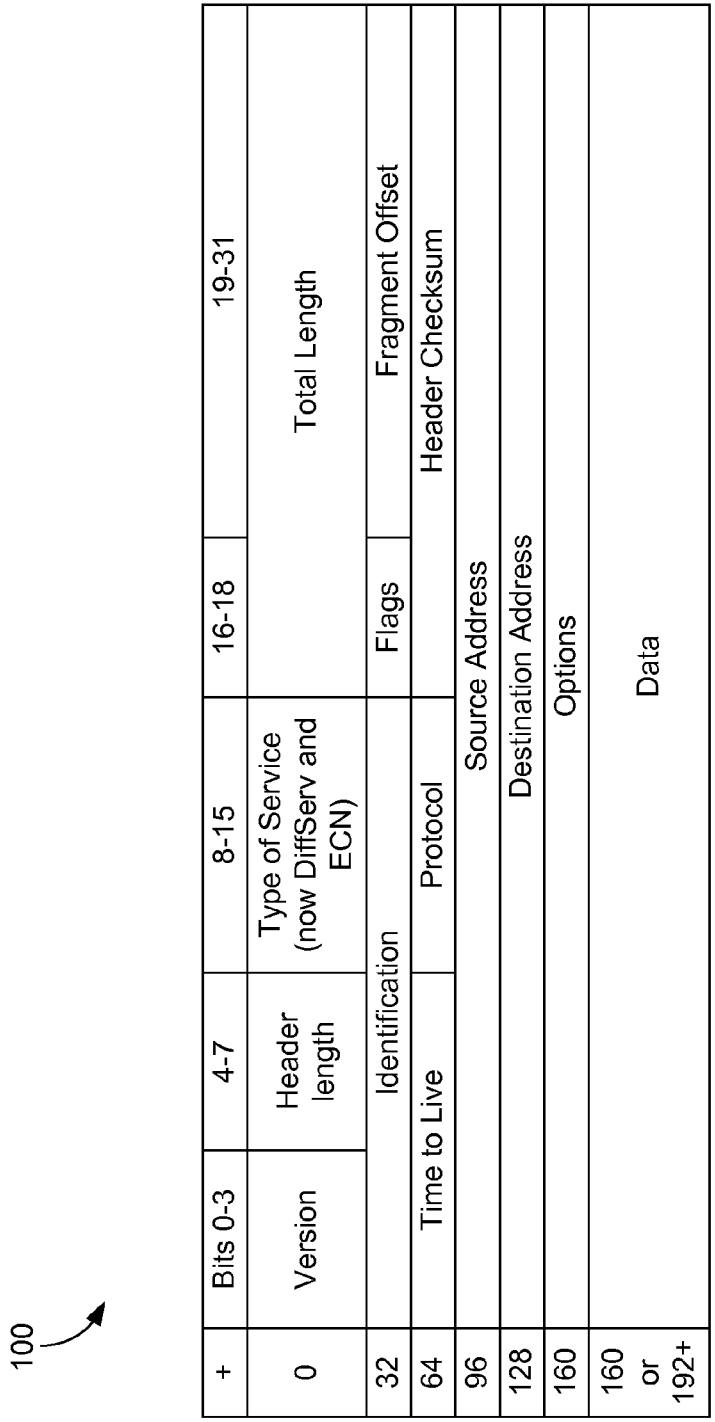
FIG. 1 illustrates an exemplary IPv4 header known in the prior art.

Embodiments of the present invention are described with specificity herein to meet statutory requirements. However, the Detailed Description itself is not intended to limit the scope of this patent. Rather, the inventors have contemplated that the claimed subject matter might also be embodied in other ways, to include different steps or combinations of steps similar to the ones described in this document, in conjunction with other present or future technologies. Although the terms "step" and/or "block" or "component" might be used herein to connote different components of methods or systems employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms and shorthand notations:

| | |
|---|---|
| CD | Compact Disc |
| CD-ROM | Compact Disk Read Only Memory |
| DVD | Digital Versatile Discs |
| EEPROM | Electrically Erasable Programmable Read Only Memory |
| IP | Internet Protocol |
| IPv | Internet Protocol Version |
| LAN | Local Access Network |
| MP3 | MPEG-1 Audio Layer 3 |
| PC | Personal Computer |
| PDA | Personal Digital Assistant |
| RAM | Random Access Memory |
| ROM | Read Only Memory |
| WAN | Wide Area Network |
| WAP | Wireless Application Protocol |

Further, various technical terms are used throughout this description. An illustrative resource that fleshes out various aspects of these terms can be found in *Newton's Telecom Dictionary* by H. Newton, 24th Edition (2008).

Embodiments of the present invention relate to systems and methods for assigning unique network identifiers in a packet-switched wired network or in a wireless network. In these networks, information is divided into packets and routed to a destination. Internet protocol (IP) is the predominant packet-switching protocol, which enables delivery of packets from a source device to a destination device. In order for a data packet to successfully complete the journey from source to destination, each source and destination device must have a unique network identifier. Currently, each network device in a wired or wireless network is assigned an IP address as a unique network identifier. IP addresses can be assigned manually, assigned automatically through a dynamic host configuration protocol (DHCP) server, or assigned via other protocols or methods.

When employing a DHCP server, the DHCP server receives client requests for IP addresses and assigns IP addresses. When the DHCP server responds to a particular client request for an IP address by assigning a client device an IP address, the assignment is detected and the IP address that is assigned to the client device (e.g., physical network device) is written to one or more storage locations, such as a router table. In networks using address resolution protocol (ARP), a device, such as a router, stores the IP address in association with the client device's media access control (MAC) address. When future packets arrive at the router, the router will perform a lookup by destination IP address to determine to which MAC address the packet should be routed.

As discussed above, the dominant standard for IP addresses is IPv4. Internet protocol version six (IPv6) has been developed as an alternative to IPv4, but IPv6 has not been widely adopted. While IPv6 would provide 128-bit addressing (providing $2^{128}$ possible addresses) and potentially reduce the concern of IPv4 address exhaustion, implementation of IPv6 requires a significant software and hardware investment.

Accordingly, embodiments of the invention relate to assigning a unique network identifier, including an IPv4 address viewed in conjunction with a value of the IP version field, to a network device in a wired or wireless network. The systems and methods described herein make use of currently unused values of the IP version field (e.g., legacy IP versions IPv0, IPv1, IPv2, and IPv3, or potential IP versions IPv7, IPv8, etc.) and allow one IP address to be assigned to potentially multiple network devices, thus providing an immediate, cost-effective solution to IPv4 exhaustion.

Embodiments of the present invention may be embodied as, among other things: a method, system, or set of instructions embodied on one or more computer-readable media. Computer-readable media include both volatile and nonvolatile media, removable and nonremovable media, and contemplates media readable by a data store, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Some of these technologies are referred to as computer-storage media.

Embodiments of the present invention provide systems, methods, and computer-readable media for routing IPv4 packets based on a variation in a field in a header of the IPv4 packets. Currently, IPv4 packets are transmitted to a destination based on a destination address value in a destination address field in the IPv4 header. Another piece of information that is included in the IPv4 header is the version field. However, the version field of the IPv4 header is not currently used as a component of an IPv4 header for routing the IPv4 packets. That is, the variance of the version field in the IPv4 header is not used as a way of distinguishing destination addresses for IPv4 packets.

The present invention provides systems and methods for varying a version field in a header in an IPv4 packet as a means of increasing the number of IPv4 addresses available. By utilizing a new field for variance, the information used in the destination address field may repeat current IPv4 header information and be used in conjunction with a new IPv4 version field to create distinctions in the IPv4 header. In order to implement embodiments of the present invention, the current software used in many routers, which disregards an IP version field of a IPv4 header, may be adjusted or provided with logic to recognize the IP version field of the IPv4 header as a means of routing data packets.

Figure 2:
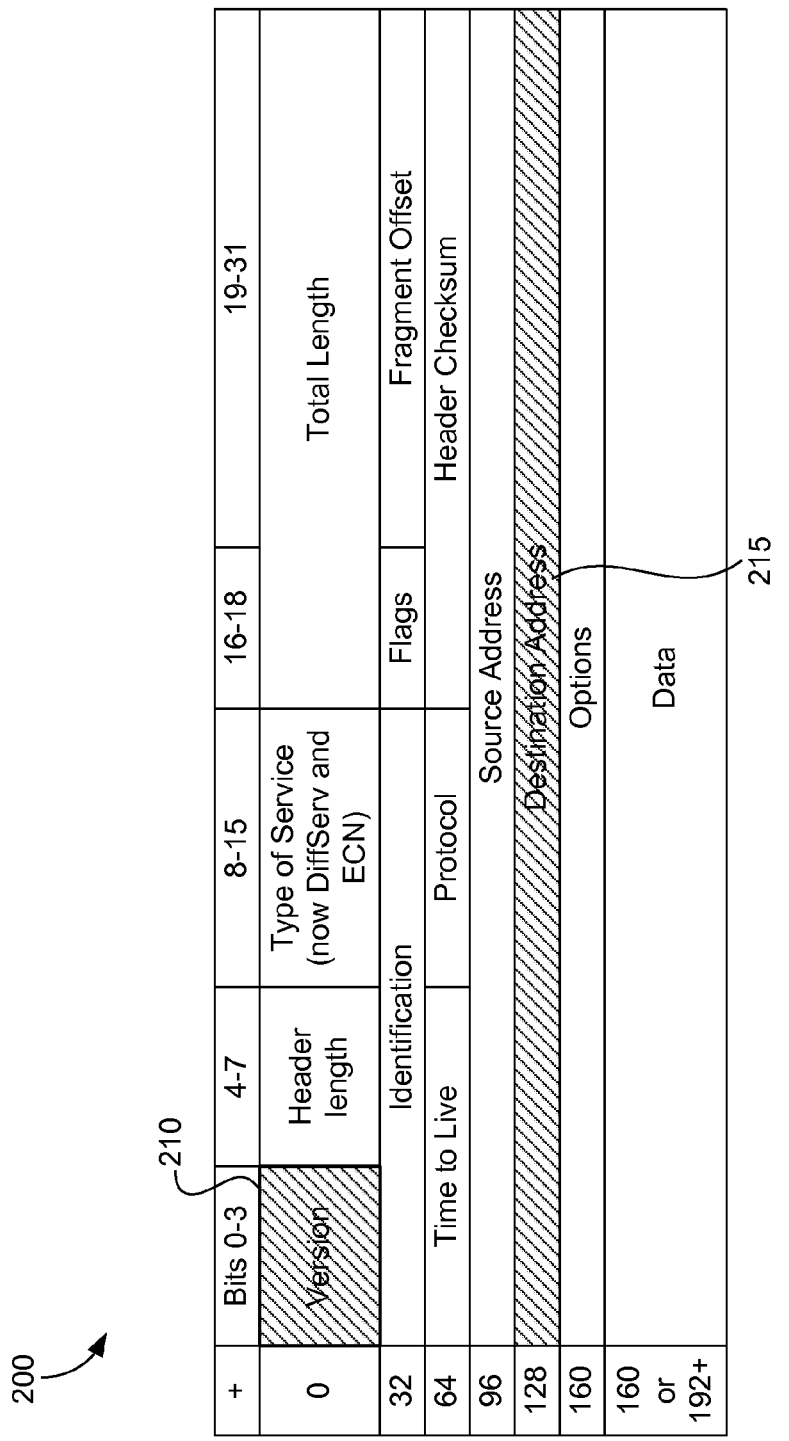
FIG. 2 illustrates an exemplary IPv4 header with a varying IP version field in accordance with an implementation of an embodiment of the invention.

Turning now to FIGS. 1 and 2, an exemplary IPv4 header 100 known in the prior art is shown in FIG. 1 and an exemplary IPv4 header 200 with a varying protocol version field is shown in FIG. 2, in accordance with embodiments of the invention. Initially, the IPv4 header 200 of FIG. 2 comprises a version field 210 with four bits and a destination address field 215. In embodiments of the invention, both the version field 210 and destination address field 215 may be used together to distinguish an IPv4 routing address, where an IPv4 routing address may have a version value and a destination address value.

Figure 3:
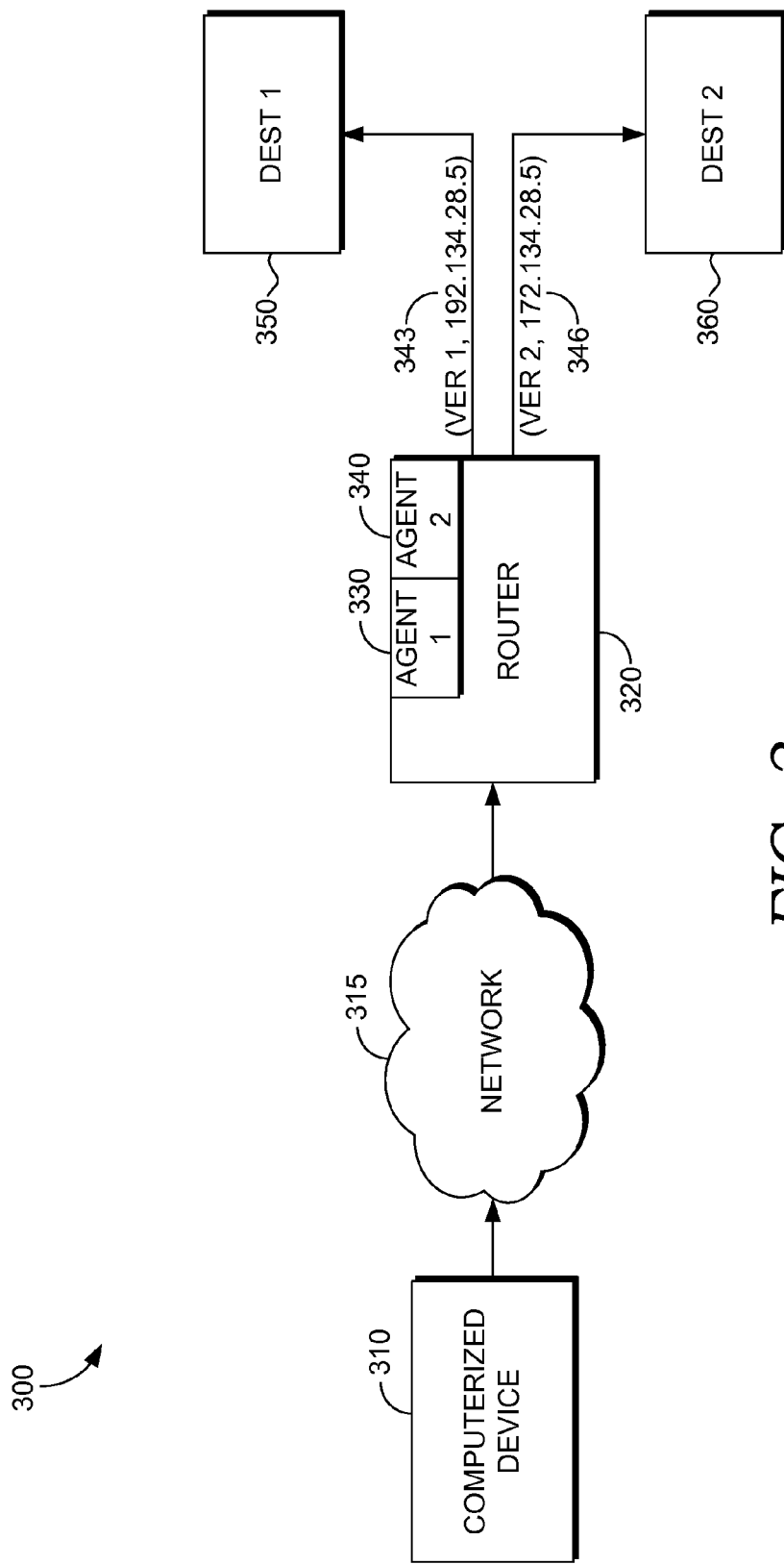
FIG. 3 provides a block diagram of an illustration of a computerized system for routing IPv4 data packets based on a variation in an IP version field in a header of the IPv4 packets.

With reference to FIG. 3, a computerized system 300 is shown that provides tangible and intangible elements for routing IPv4 data packets based on a variation in an IP version field in a header of the IPv4 packets, in accordance with an embodiment of the invention. As shown in FIG. 3, the exemplary system 300 includes a computerized device 310, a network 315, a router 320, an agent 330, an agent 340, a first routing address 343, second routing address 346, a first destination 350, and a second destination 360.

The computerized device 310 can be any computing device that is capable exchanging IPv4 data packets. In embodiments, computerized device 310 might be any computing device that can request, receive, and present web-based content. As such, computerized device 310 might take on a variety of forms, such as a personal computer (PC), a laptop computer, a mobile phone, a personal digital assistance (PDA), a server, a CD player, a MP3 player, a video player, a handheld communications device, a workstation, any combination of these devices, or any other device that is capable of web accessibility. In one embodiment, computerized device 310 is a mobile device that utilizes a wireless telecommunications network to communicate. Makers of illustrative mobile devices include, for example, Research in Motion®, Creative Technologies Corp., Samsung®, Apple® Computer, and the like. A mobile device can include, for example, a display, a power source (e.g., a battery), a data store, a speaker, a memory, a buffer, and the like.

The network 315 can be wired, wireless, or both. Further, the network 315 can be combined into a single network or can include multiple networks, as well as being a network of networks, but is shown in more simple form so as to not obscure other aspects of the present invention. For example, the network 315 may include one or more wide area networks (WANs), one or more local area networks (LANs), one or more public networks, such as the Internet, and/or one or more private networks. The network 315 might include an array of devices, which are not shown so as to not obscure more relevant aspects of the invention. In a wireless telecommunications network, components such as a base station, a communications tower, or even access points (as well as other components) can provide wireless connectivity in some embodiments. Although single components are illustrated for clarity, one ordinarily skilled in the art will appreciate that network 315 can enable communication between any number of user devices using, for example, Wireless Access Protocol (WAP).

The computerized device 310 may generate a first IPv4 data packet and a second IPv4 data packet. The first IPv4 data packet may have a routing address 343 of (version 1, 192.134.28.5) and the second IPv4 data packet may have a routing address 346 of (version 2, 192.134.28.5), wherein a routing address comprises a version value and a destination address value, both from the data in the fields of a first IPv4 packet and the second IPv4 packet, respectively. The first IPv4 packet may include a first version value and a first destination address value in the field in the header of the first IPv4 data packet. The second IPv4 packet may include a second version value and a second destination address value in the field in the header of the second IPv4 data packet. The first and second IPv4 packets may be transmitted over a network 315, where they may be intercepted by a router 320. Router 320 may receive the first and second IPv4 data packets, wherein the first version value in the field in the header of the first IPv4 data packet differs from the second version value in the field in the header of the second IPv4 data packet. Agent 330 at router 320 may send the first IPv4 data packet to a first destination 350 based on the first version value and the first destination address value in the first IPv4 data packet. Additionally, agent 340 at the router may send the second IPv4 data packet to a second destination 360 based on the second version value and the second destination address value in the second IPv4 data packet. Although FIG. 3 shows both agents 330 and 340, an implementation of an embodiment can have router 320 with only one agent that can route all types of IPv4 packets.

Figure 4:
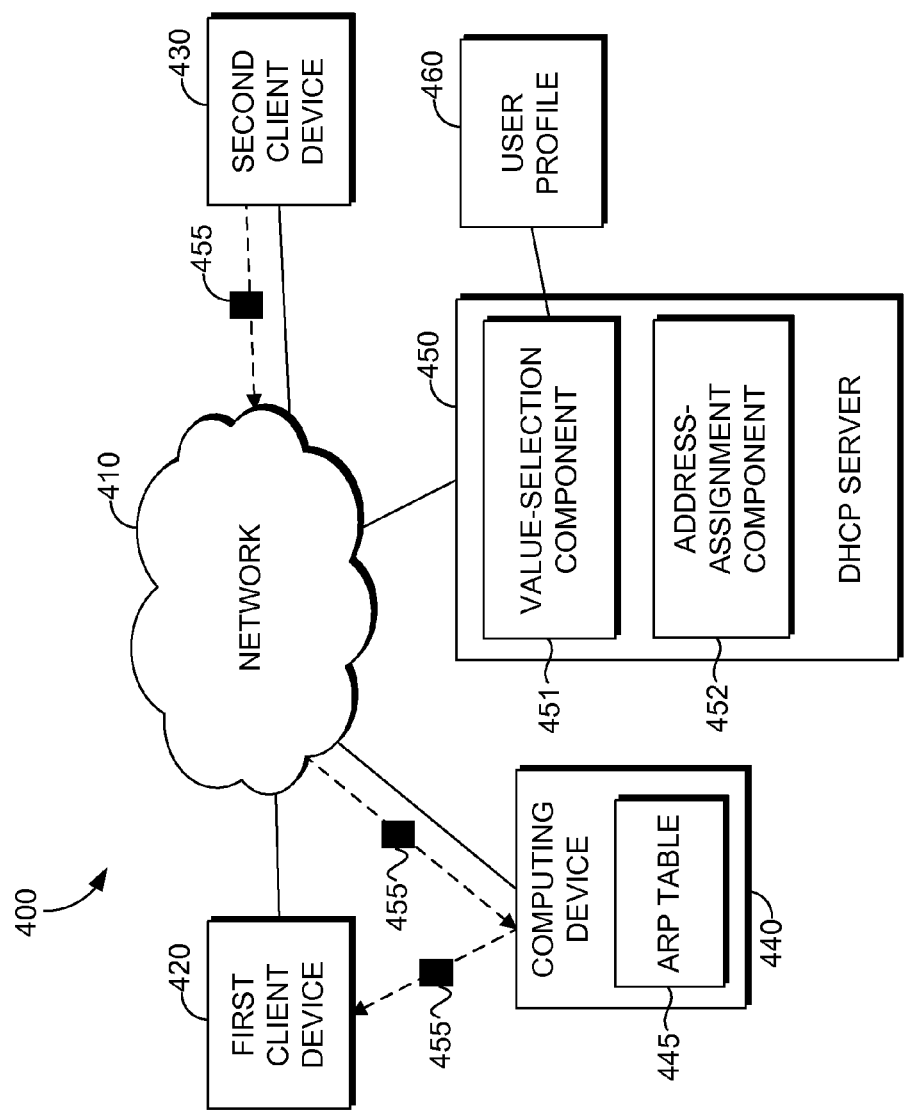
FIG. 4 is a block diagram illustrating an exemplary system architecture suitable for use in implementing embodiments of the present invention.

Turning now to FIG. 4, a block diagram illustrating an exemplary system architecture 400 suitable for use in implementing embodiments of the present invention is shown. In embodiments, the system architecture 400 is generally configured to assign network identifiers to client devices 420 and 430, and others, that are active in a network 410. As depicted, the system architecture 400 includes the client devices 420 and 430, a computing device 440, a DHCP server 450 that hosts a value-selection component 451 and an address-assignment component 452, and a user profile 460.

This exemplary system architecture 400 is but one example of a suitable environment that may be implemented to carry out aspects of the present invention, and is not intended to suggest any limitation as to the scope of use or functionality of the invention. Neither should the illustrated exemplary system architecture 400 be interpreted as having any dependency or requirement relating to any one or combination of the components 451 and 452 as illustrated. In some embodiments, one or more of the components 451 and 452 may be implemented as stand-alone devices. In other embodiments, one or more of the components 451 and 452 may be integrated directly into the computing device 440 or the client devices 420 and 430. It will be understood by those of ordinary skill in the art that the components 451 and 452 illustrated in FIG. 4 are exemplary in nature and in number and should not be construed as limiting.

Accordingly, any number of components may be employed to achieve the desired functionality within the scope of embodiments of the present invention. Although the various components of FIG. 4 are shown with lines for the sake of clarity, in reality, delineating various components is not so clear, and metaphorically, the lines would more accurately be grey or fuzzy. Further, although some features of FIG. 4 are depicted as single blocks, the depictions are exemplary in nature and in number and are not to be construed as limiting (e.g., although only two client devices 420 and 430 are shown, many more may be communicatively coupled to the DHCP server 450).

In embodiments, the DHCP server 450 is generally configured to allocate a first fractional IP address (including an IPv4 address and a first value of an IP version field), to allocate a second fractional IP address (including the IPv4 address and a second value of the IP version field), and to assign the first fractional IP address to the first client device 420 and the second fractional IP address to the second client device 430. Typically, an ARP table 445 stores, at least temporarily, the assigned first fractional IP address in association with the first client device 420 and the assigned second fractional IP address in association with the second client device 430. In embodiments, the computing device 440 can access and read the ARP table 445 upon receiving a data packet, compare a fractional IP address in a header of the data packet with entries in the ARP table 445, and direct transmission of the data packet within the network 410 based on the fractional IP address. In one instance, when traffic between the first client device 420 and the second client device 430 travels outside a local network or between partitioned networks, the computing device 440 may be embodied as a router that refers to the ARP table 445 or a routing table (having fractional IP addresses stored thereon) to properly distribute the data packets.

The DHCP server 450 and the computing device 440, in embodiments, may take the form of various types of computing devices, such as, for example, a personal computer, desktop computer, laptop computer, wireless device, consumer electronic device, handheld device (e.g., personal digital assistant), various servers, a computing cloud, and the like. It should be noted, however, that the invention is not limited to implementation on such computing devices, but may be implemented on any of a variety of different types of computing devices within the scope of embodiments of the present invention.

Further, the DHCP server 450 and the computing device 440, in embodiments, may include memory that is linked to some form of a computing unit (e.g., central processing unit, microprocessor, etc.) to support operations of the components running thereon (e.g., value-selection component 451 or address-assignment component 452). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the DHCP server 450 and the computing device 440 in order to enable each device to perform communication-related processes and other operations (e.g., allocating a value of the IP version field based on one or more criteria). In another instance, the computing unit may encompass a processor coupled to computer-readable media.

Generally, the computer-readable media stores, at least temporarily, a plurality of computer software components, including the components 451 and 452, that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Returning to FIG. 4, the first client device 420 and the second client device 430 represent two devices, of potentially millions of devices, that may be actively communicating with each other across the network 410. By way of example only and not limitation, the client devices 420 and 430 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 410. It should be noted, however, that the invention is not limited to implementation on such computing devices, but may be implemented on any of a variety of different types of computing devices within the scope of embodiments of the present invention.

In an exemplary embodiment of operation, the first client device 420 may become active on the network 410. In some instances, becoming active involves powering up and achieving connectivity with the network 410. Upon becoming active, the first client device 420 may query the DHCP server 450 with a request to provide a network identifier that is unique within the context of the network 410, thereby allowing the computing device 440 to identify a destination of data packets originating from a third-party device that are designated for either the first client device 420 or the second client device 420. Upon detecting the first client device 420 as being active on the network 410, or upon receiving the request from the first client device 420, the DHCP server may dynamically commence a process of assigning a first fractional IP address to the first client device 420. Generally, the first fractional IP address uniquely identifies the first client device 420 within the network 410 while recycling IPv4 addresses that have been previously assigned to other devices, which are active on the network 410, such as the second client device 430. Accordingly, the limited address space associated with IPv4 addresses is expanded through incorporation of IP-version-field values into data-packet headers.

The process of assigning the first fractional IP address to the first client device 420, implemented by the DHCP server 450, may initially involve assigning to the first client device 420 an IPv4 address that has values of the IP version field remaining available for allocation. Typically, there various values associated with the IP version field. These values may include legacy versions IPv0, IPv1, IPv2, and IPv3, current versions IPv4, IPv5, and IPv6, and potential versions IPv7 and up. However, in an exemplary embodiment, the potential versions IPv7 and up are excluded from being allocated to form the fractional IP address due to the possibility that the potential versions may be employed in the future to indicate a new IP version for sending data packets. Further, in an exemplary embodiment, the current versions IPv5 and IPv6 are withdrawn from being available for selection in forming the fractional IP address due to a likelihood that the computing device 440 will be confused as to whether the current version is indicating that the data packets conform with version 5 or version 6 Internet protocol, or whether the current version is simply being used to generate a unique network identifier. As such, the remaining IP-version-field values (IPv0-Ipv4) can be used without the need for future modifications or the potential of confusion, as the computing device 440 can be programmed with logic to view the remaining IP-version-field values as indicating Internet protocol version 4.

These values may be represented as a 4-bit, binary number or may be referenced in any other format that may be employed to address a data packet. By way of example, the value of IPv0 may be 0000, the value of IPv1 may be 0001, the value of IPv2 may be 0010, the value of IPv3 may be 0011, and the value of IPv4 may be 0100. Although a single configuration of the representation of the IP-version-field value has been described, it should be understood and appreciated that other types of suitable formats or representations that can identify one or more values of the IP version field may be used, and that embodiments of the present invention are not limited to those 4-bit, binary representations described herein.

In addition, those values associated with the IP version field that are currently or previously allocated to a client device on the network 410 are considered to be in use and are not available values. By way of example, the DHCP server 450 is configured to track and record the values associated with both the IP version field and a particular IPv4 address that are in use, and to target those remaining values that are not in use for allocation to the first client device 420. In embodiments, the value-selection component 451 is configured to carry out the steps of determining which IP-version-field values are appropriate to use, ascertaining which of the appropriate IP-version-field values remain available for allocation, and allocating one of the available IP-version-field to a client device. In one instance, the client device may be consistently assigned a particular IP-version-field value each time a request for a network identifier is made therefrom. An association between the client device and its assigned IP-version-field value may be written to the user profile 460. In operation, the user profile 460 may be accessed by the value-selection component 451 upon the value-selection component 451 determining which IP-version-field value to assign to the client device.

Once an IPv4 address associated with one of the available IP-version-field values is allocated to the first client device 420, the address-assignment component 452 assigns a fractional IP address to the first client device 420, where the fractional IP address uniquely identifies the first client device 420 within the network 410. In embodiments, assigning includes communicating the fraction IP address (e.g., the allocated IP-version-field value and an associated IPv4 address) to the first client device 420 and recording the fraction IP address to the ARP table 445, or another memory location. The ARP table 445 is configured to be searchable for fraction IP addresses and the client devices associate therewith, and can store the fraction IP addresses for any duration of time. Although two different components for selecting and assigning IP-version-field values have been described, it should be understood and appreciated that other types of suitable mechanisms that select available IP-version-field values based on other criteria may be used, and that embodiments of the present invention are not limited to the value-selection component 451 and the address-assignment component 452 described herein. For instance, IP-version-field values may be selected based on properties, or functional capabilities, of the client device that is requesting the network identifier.

Once the DHCP server 450 assigns to the first client device 420 the IPv4 address and an IP-version-field value (e.g., utilizing one or more of the components 451 and 452), the resultant fractional IP address is communicated to the first client device 420 and, potentially, stored at the ARP table 445 and/or at another memory location that is accessible to the DHCP server 450 or to the computing device 440. When attempting to communicate across the network 410, the first client device 420 may insert the fractional IP address into a header of IPv4 data packets that are transmitted therefrom. The fractional IP address within the header allows the computing device 440, via the ARP table 445, to identify the sender of the IPv4 data packets as the first client device 420. In addition, the computing device 440 is capable of routing IPv4 data packets 455 to the first client device 420 upon another client device, such as the second client device 430, populating the header of the IPv4 data packets 455 with the fractional IP address assigned to the first client device 420. By way of example, the computing device 440 represents a last router in a hub structure of the network 410 that inspects the IP-version-field value of the fractional IP address to properly route the IPv4 data packets 455 to the first client device 420.

Figures 5, 6:
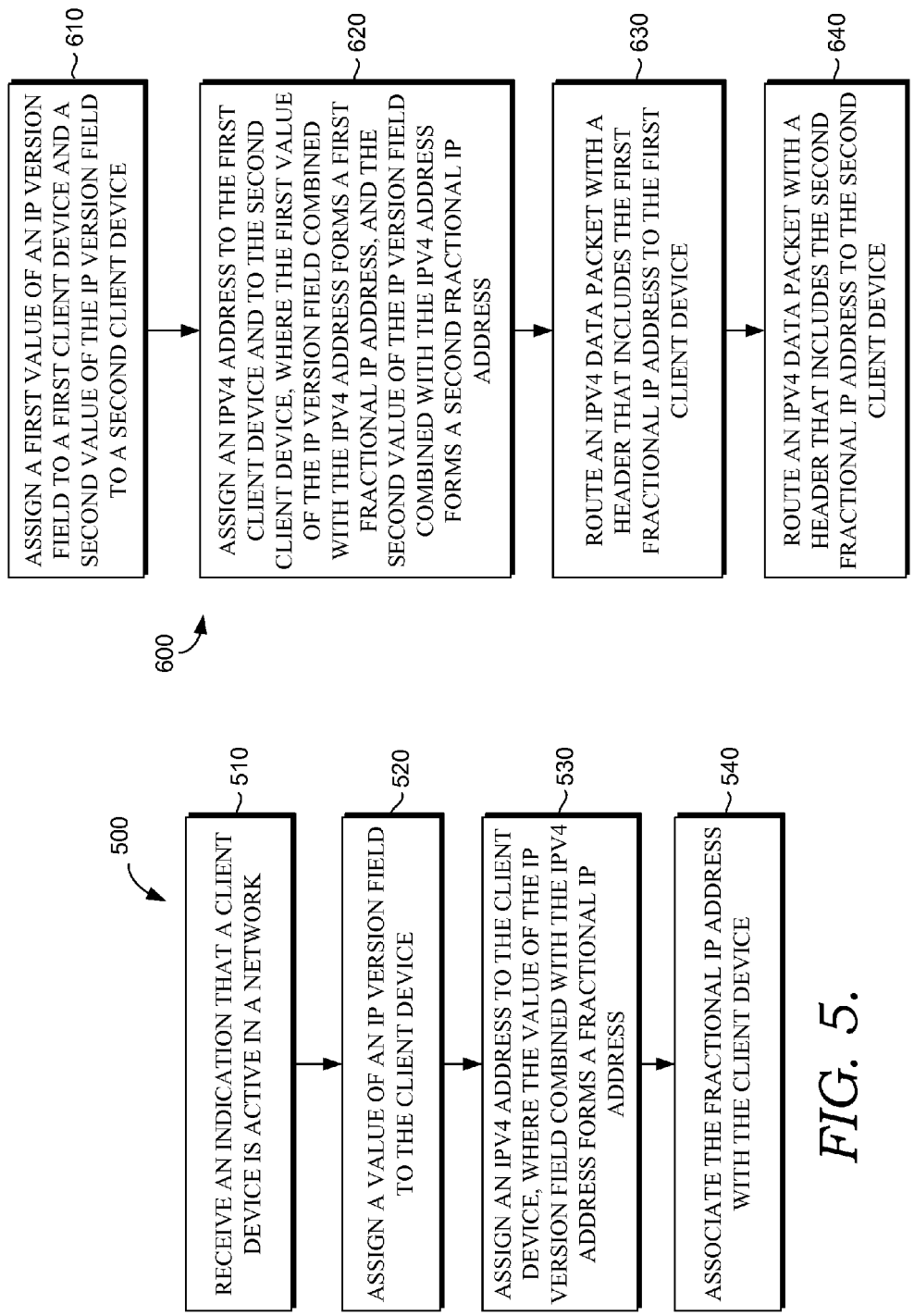
FIG. 5 is a flow chart of an exemplary method for assigning network identifiers to client devices in a network, in accordance with an embodiment of the present invention.
FIG. 6 is a flow chart of an exemplary method for assigning network identifiers to client devices in a network, in accordance with an embodiment of the present invention.

Turning now to FIG. 5, a flow chart is shown that illustrates an exemplary method 500 for assigning network identifiers to client devices in a network, according to embodiments of the present invention. The method 500 includes receiving an indication that a first client device is active in the network, as depicted at block 510. Typically, the network supports transmission of IPv4 packets using wire-line technology, wireless technology, or a combination thereof. The method 500 may further include assigning a first value of an IP version field to the first client device and assigning an IPv4 address to the first client device, as depicted at blocks 520 and 530, respectively. In one embodiment, assigning the first value of the IP version field includes selecting from a plurality of values of the IP version field that are available for assignment, such as one of legacy versions IPv0, IPv1, IPv2, and IPv3, current versions IPv4, IPv5, and IPv6, or potential versions IPv7 and up.

As described more fully above, the first value of the IP version field may be combined with the IPv4 address to form a first fractional IP address. As depicted at block 540, the first fractional IP address may be associated with the first client device. This association can be written to a memory location, such as a routing table, that is accessible by the DHCP server for storage purposes and is available to a router for directing data packets through the network. For instance, when a header of an IPv4 data packet includes the first fractional IP address, the router may refer to the routing table to identify the first client device as the destination of the IPv4 data packet.

With reference to FIG. 6, a flow chart is shown that illustrates an exemplary method 600 for assigning network identifiers to client devices in a network, according to embodiments of the present invention. The method 600 includes assigning a first value of an IP version field to a first client device and a second value of the IP version field to a second client device, as depicted at block 610. As depicted at block 620, the method 600 may further include assigning an IPv4 address to the first client device and to the second client device. Typically, the first value of the IP version field, in conjunction with the IPv4 address, forms a first fractional IP address, while the second value of the IP version field, in conjunction with the IPv4 address, forms a second fractional IP address. Upon reading the first fractional IP address incorporated in a header of an IPv4 data packet, a router, the DHCP server, or another device may be configured to route the IPv4 data packet to a first destination, such as the first client device, as depicted at block 630. In addition, upon reading the second fractional IP address incorporated in a header of an IPv4 data packet, the router, the DHCP server, or another device may be configured to route the IPv4 data packet to a second destination, such as the second client device, as depicted at block 640. Accordingly, an individual IPv4 address can be expanded to uniquely identify, within the context of the network, multiple client devices.

Figure 7:
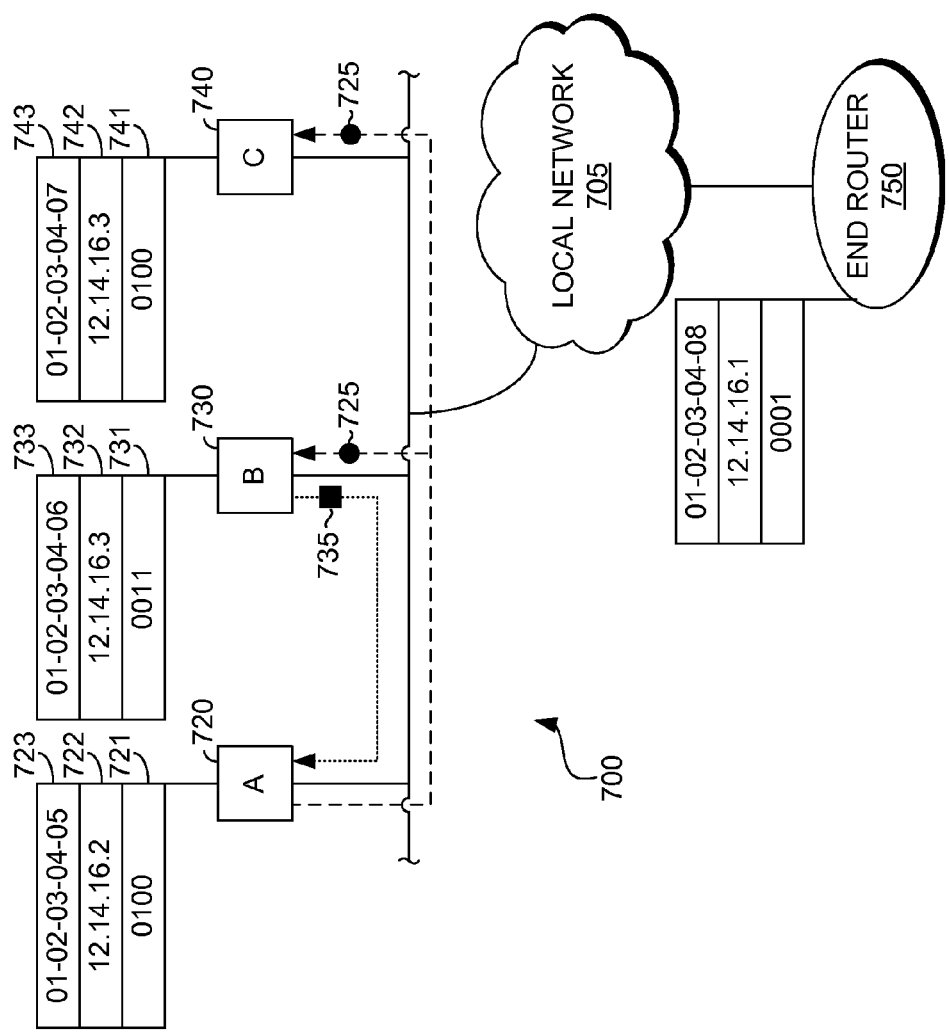
FIG. 7 is a block diagram illustrating an exemplary system architecture suitable for use in implementing embodiments of the present invention.

Turning now to FIG. 7, a block diagram illustrating an exemplary system architecture 700 suitable for use in implementing embodiments of the present invention is shown. In embodiments, the system architecture 700 is generally configured to provide the ability for host device A 720 to determine a data-link layer (layer 2) address, such as a MAC address, of other host devices within a local network 705, such as host device B 730 or host device C 740. As depicted, the system architecture 700 includes the host device A 720 (originating host device), the host device B 730 (destination host device), the host device C 740, and an end router 750 all interconnected via the local network 705.

This exemplary system architecture 700 is but one example of a suitable environment that may be implemented to carry out aspects of the present invention, and is not intended to suggest any limitation as to the scope of use or functionality of the invention. Neither should the illustrated exemplary system architecture 700 be interpreted as having any dependency or requirement relating to any one or combination of the host devices 720, 730, and 740 as illustrated. It will be understood by those of ordinary skill in the art that the host devices 720, 730, and 740 illustrated in FIG. 7 are exemplary in nature and in number and should not be construed as limiting.

Accordingly, any number of devices may be employed to achieve the desired functionality within the scope of embodiments of the present invention. Although the various devices of FIG. 7 are shown with lines for the sake of clarity, in reality, delineating various devices is not so clear, and metaphorically, the lines would more accurately be grey or fuzzy. Further, although some features of FIG. 7 are depicted as single blocks, the depictions are exemplary in nature and in number and are not to be construed as limiting (e.g., although only three host devices 720, 730, and 740 are shown, many more may be communicatively inter-coupled within the local network 705).

The host device A 720, the host device B 730, and the host device C 740 represent three devices, of potentially millions of devices, that may be actively communicating with each other across the local network 705. By way of example only and not limitation, the host devices 720, 730, and 740 may be a handheld wired or wireless device (e.g., personal digital assistant, cell phone, GPS device, and the like), a computing device (e.g., personal computer, desktop computer, laptop computer, server, and the like), a consumer electronic device, and other devices that are capable of communicating over the network 705. In instance, the host devices 720, 730, and 740 may represent one or more of the client devices 420 and 430 of FIG. 4. It should be noted, however, that the invention is not limited to implementation on such computing devices, but may be implemented on any of a variety of different types of computing devices within the scope of embodiments of the present invention. Further, the local network 705 may be any type of network (e.g., wired, wireless, Internet, LAN, packet-switched network, and the like) that facilitates intercommunication between the host devices 720, 730, and 740.

Initially, each of the host devices 720, 730, and 740 is provisioned with a data-link layer address. The data-link layer pertains to a set of protocols that operate to within a networking architecture of the local network 705 to interconnect the host devices 720, 730, and 740 over a physical layer (layer 1). Although a variety of types of data-link layer addresses may be employed, the exemplary embodiment depicted in FIG. 7 shows the host devices 720, 730, and 740 each provisioned with a unique MAC address. In particular, the host device A 720 is provisioned with MAC address 01-02-03-04-05 (shown at reference numeral 723), the host device B 730 is provisioned with MAC address 01-02-03-04-06 (shown at reference numeral 733), and the host device C 740 is provisioned with MAC address 01-02-03-04-07 (shown at reference numeral 743). Typically, as used herein, the phrase "MAC address" generally refers to a globally unique identifier assigned to nodes (e.g., host devices 720, 730, and 740) within the local network 705. In embodiments, MAC addresses are permanently assigned by a manufacturer of the node and usually encodes the manufacturer's registered identification number.

In an exemplary embodiment of operation, each of the host devices 720, 730, and 740 is assigned a fractional IP address, which pertains to a unique network identifier of each of the nodes active within the local network 705, as discussed above. Also, as more fully discussed above, the fractional IP addresses includes an IPv4 address and a value of an IP version field. As shown in FIG. 7, the host device A 720 is assigned IPv4 address 12.14.16.2 (reference numeral 722), while the host devices 730 and 740 are assigned a common IPv4 address 12.14.16.3 (reference numerals 732 and 742). However, the fractional IP address are distinct because the host device B 730 is assigned the version value of IPv3, designated by 0011 (see reference numeral 731), while the host device C 740 is assigned version value of IPv4, designated by 0100 (see reference numeral 741). That is, the fractional IP addresses allow for the assignment of many unique network identifiers to the host devices 730 and 740 interconnected on the same local network 705 that use the same IPv4 address by assigning different, non-overlapping IP-version-field values thereto. As discussed above, various allocation processes may be employed to determine the appropriate IP-version-field value that is assigned to a particular device.

Upon assigning these fractional IP addresses to the host devices 720, 730, and 740, the host devices 720, 730, and 740 may communicate over the local network 705 using these assigned fractional IP addresses. In an exemplary embodiment, the host device 720 that is preparing to initiate a communication (i.e., originating host device) may identify a name of a host device to target as the recipient of the communication (i.e., destination host device). For instance, the originating host device A 720 may receive a user-initiated instruction to connect to a web address "Sprint.com."

The originating host device A 720 may then determine the destination host device's network (layer 3) address, or IPv4 address, by conducting a resolution operation. In instances, the originating host device A 720 utilizes a domain name system (DNS) lookup to perform the resolution operation that translates the name (e.g., Sprint.com) of the destination host device to an IPv4 address and an IP-version-field value that are accessed in combination to convey the communication.

This resolved IPv4 address in conjunction with the IP-version-field value correspond to one particular fractional IP address within the local network 705. Typically, this particular fractional IP address has been previously assigned to the destination host device by a DHCP server. Once the particular fractional IP address is known to the originating host device A 720, the originating host device A 720 broadcasts a request message 725 that includes the fractional IP address to the host devices B 730 and C 740 and other nodes connected via the local network 705. The general intent of the request message 725 is to solicit the data-link layer address, or MAC address, of the destination host device and to use the MAC address to route data packet(s) thereto.

Upon receiving the request message 725, the host devices 730 and 740 in the local network 705 may access the fractional IP address carried in the request message 725 and may compare the accessed fractional IP address against the fractional IP addresses that they have been assigned. In one embodiment, of those host devices and nodes in the local network 705 that receive the request message 725, just the destination host device may ascertain that the accessed fractional IP address in the request message 725 matches its assigned fractional IP address. For instance, if "Sprint.com" corresponds to IPv4 address 12.14.16.3 and IP-version-field value 0011, host device B 730 will likely ascertain that the fractional IP address in the request message 725 is associated with host device B's 730 assigned fractional IP address.

Accordingly, in this embodiment, just the destination host device B 730 may respond to the originating host device A 720 with a confirmation of the match and an indicia of the MAC address assigned to the destination host address B 730. For instance, upon destination host device B 730 ascertaining that the fractional IP address in the request message 725 is associated with its assigned fractional IP address, the destination host device B 730 is now self-identified as the proper destination host device and sends a response 735 to the originating host device A 720. In addition, the destination host device B 730 may include within the payload of the response 735 its MAC address 01-02-03-04-06 (see reference numeral 733).

Upon receiving the response 735 from the destination host device B 730, the originating host device A 720 is configured to write an entry into a host table that includes the MAC address 733 mapped to the fractional IP address 731 and 732 assigned to the destination host device B 730. Turning now to FIG. 8, a diagrammatic illustration of an exemplary host table 800 is shown, according to an embodiment of the present invention. As show, entry 830 of the host table 800 reflects the information communicated to the originating host device A 720 within the response 735.

In other embodiments, a plurality of nodes within the local network respond to the request message 725. In one instance, the nodes that have been assigned a IPv4 address common to the IPv4 address in the request message 725 may respond without comparing IP-version-field value within the request message 725 against their assigned IP-version-field value. In another instance, a multitude of nodes may respond to the request message 725 without further comparing the information of the request message 725 against their assigned network identifiers. As such, the originating host device A 720 may receive a plurality of responses from interconnected nodes and may write information conveyed in one or more of the plurality of responses to the host table 800. As depicted at FIG. 8, an end router 750 of FIG. 7, as well as host devices B 730 and C 740 have responded to the request message 725. Further, the originating host device A 720 has written the information from the end router 750, and host devices B 730 and C 740 into the host table 800 as entries 810, 830, and 840, respectively.

In the embodiment where many nodes of the local network 705 have responded to the request message 725, the originating host device A 720 may sort through the host table 800 to determine the appropriate destination host device. In one instance, sorting through the host table 800 may involve the originating host device A 720 comparing the IP-version-field value that was identified in the resolution process against the IP-version-field values written within the entries 810, 830, and 840 of the host table 800. In this instance, the originating host device A 720 may select the appropriate destination host device upon ascertaining that the resolved IP-version-field value matches an IP-version-field value assigned to one or more nodes. Additionally, the originating host device A 720 may select the appropriate destination host device upon ascertaining that the resolved IPv4 address matches an IPv4 address assigned to one or more nodes that have responded. Upon selecting the appropriate destination host device (i.e., identifying a host device whose assigned IPv4 address corresponds with the resolved IPv4 address and whose assigned IP-version-field address includes the resolved port or range of ports), the originating host device A 720 identifies a MAC address of the appropriate destination host device by inspecting the data-link layer address mapped thereto within the host table 800.

Although a single configuration of the host table 800 has been described, it should be understood and appreciated by those of ordinary skill in the art that other types of suitable formats that allow for entries to be added, updated, and removed may be used, and that embodiments of the present invention are not limited to those line-type entries 810, 820, 830, and 840 described herein. Further, the number of and information within the entries of the table 800 may vary from those shown in FIG. 8. For instance, in the embodiment where just those nodes that are assigned an IPv4 address that matches the resolved IPv4 address are configured to provide a response to the request message 725, a column that includes "IP addresses" may be removed from the host table 800 for being redundant.

Further, in typical embodiments, the column that includes a "Name" of the nodes represented in the host table 800 would not be present. Accordingly, the "Name" column is shown in FIG. 8 for the purpose of explaining aspects of the present invention and for general demonstration reasons only. But, in some instances, where the host table 800 is configured as an ARP table accessible by or residing on a DHCP server, the "Name" column might be present and populated with identifiers of various nodes in a local network.

Further, the host table 800 may be stored in any location that is operably coupled to the originating host device A 720, thereby allowing access thereto. In one embodiment, a DHCP server may temporarily store at an ARP table the assigned fractional IP addresses in conjunction with MAC addresses, similar to the configuration shown in the host table 800. In another embodiment, a router may store in a routing table the fractional IP addresses in conjunction with MAC addresses, similar to the configuration shown in the host table 800. In operation, the router 750 may employ the routing table to direct data packets that are transmitted outside the local network 705. These embodiments are more fully discussed below.

Referring back to FIG. 7, in one embodiment, when the originating host device A 720 constructs data packet(s) to transmit to the destination host device, which was determined to be the host device B 730 in this embodiment, the originating host device A 720 may read the host table 800 of FIG. 8 to determine the MAC address of the destination host device B 730. Upon determining the MAC address of the destination host device B 730, the originating host device A 720 typically incorporates the MAC address into a pre-designated portion of the header of the data packet(s). Consequently, the destination host device B 730 may properly receive the data packet(s) upon transmission from the originating host device A 720.

Figure 9:
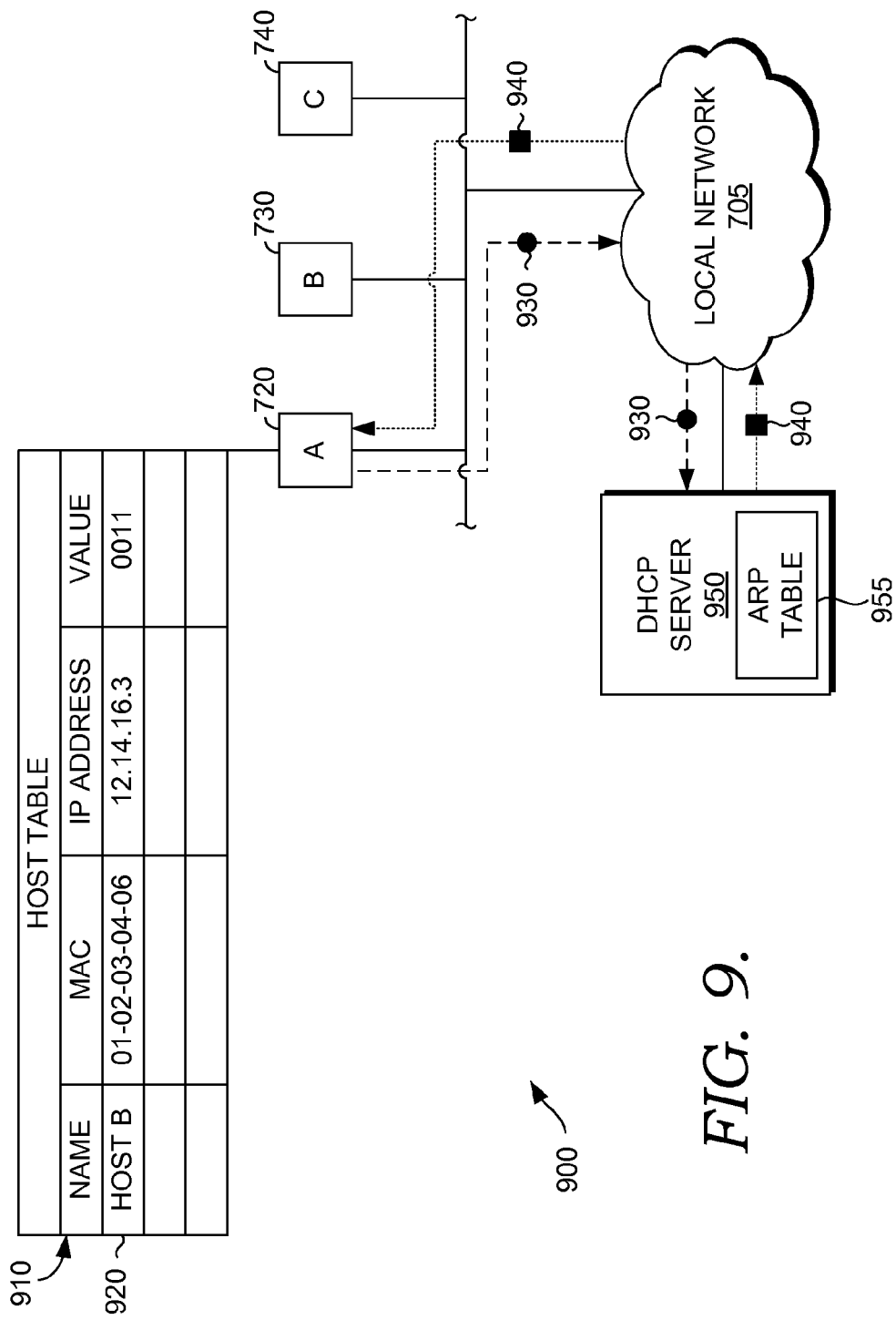
FIG. 9 is a block diagram illustrating an exemplary system architecture for determining a data-link layer address from a network address, according to an embodiment of the present invention.

Referring now to FIG. 9 a block diagram illustrating an exemplary system architecture 900 for routing data packets using a data-link layer address is shown, according to embodiments of the present invention. Initially, FIG. 9 includes a DHCP server 950 that has stored thereon an ARP table 955. In this embodiment, the DHCP server 950 is generally employed to determine a MAC address of an appropriate destination host device upon being solicited by the originating host device A 720. This embodiment essentially eliminates the process of sending request messages 930 to a multitude of host devices interconnected within the local network 705.

In embodiments, the DHCP server 950 is generally configured to receive the request message 930 from an originating host device, such as the host device A 720, and return a reply 940 with a data-link layer address, such as a MAC address. In an exemplary embodiment, the DHCP server 950 is further configured to allocate a first fractional IP address (including an IPv4 address and a first range of ports), to allocate a second fractional IP address (including the IPv4 address and a second range of ports), to allocate a third fractional IP address (including the IPv4 address and a third range of ports), and to assign the first, second, and third fractional IP addresses to the host devices 720, 730, and 740, respectively—similar to the functionality of DHCP server 450 of FIG. 4.

Typically, the DHCP server 950 is operably coupled to the ARP table 955 (e.g., ARP table 445 of FIG. 4) that stores, at least temporarily, the assigned fractional IP addresses in association with the respective host devices 720, 730, and 740, as well as their MAC address. For instance, with regard to the originating host device A 720, the ARP table 955 may maintain the assigned IPv4 address 12.14.16.2 (shown at reference numeral 722 of FIG. 7) and the assigned IP-version-field value (shown at reference numeral 721 of FIG. 7) in association with an indicia of the host device A 720, and its MAC address 01-02-03-04-05 (see reference numeral 723 of FIG. 7).

The DHCP server 950, in embodiments, may take the form of various types of computing devices, such as, for example, a personal computer, desktop computer, laptop computer, wireless device, consumer electronic device, handheld device (e.g., personal digital assistant), various servers, processing units distributed within a computing cloud, and the like. It should be noted, however, that the invention is not limited to implementation on such computing devices, but may be implemented on any of a variety of different types of computing devices within the scope of embodiments of the present invention. Further, the DHCP server 950, in embodiments, may include memory that is linked to some form of a computing unit (e.g., central processing unit, microprocessor, etc.) to support operations running thereon. In another instance, the computing unit may encompass a processor coupled to computer-readable media that stores, at least temporarily, information (e.g., ARP table 955) that is readable or executable by the processor.

As discussed above, in an embodiment of operation, the DHCP server 950 is configured to receive the request message 930 from the originating host device A 720. In an exemplary embodiment, the request message 930 may take the form of an ARP request. As used herein, the phrase "ARP request" generally refers to a computer networking protocol for determining a host device's data-link layer (layer 2) address when just the network (layer 3) address is known. Further, this protocol may be employed in local area networking as well as for routing inter-networking traffic across gateways or routers based on IP addresses. In operation, ARP allows nodes on the same broadcast domain, or local network 705, to intercommunicate with each other. However, although the ARP request is described as an exemplary embodiment, the request message 930 may be implemented utilizing various other communications technologies or protocols.

Typically, the request message 930 includes an IPv4 address and an IP-version-field value that was determined during the resolution operation discussed above. Upon identifying the resolved IPv4 address and the IP-version-field value carried in the request message 930, the DHCP server 950 accesses the ARP table 955 that is populated with a plurality of entries. These entries may be created upon assigning the fractional IP addresses to the host devices 720, 730, and 740 when they become active within the local network 705. Also, these entries in the ARP table 955 may include MAC addresses mapped to both IPv4 addresses and IP-version-field values.

Next, in embodiments, the DHCP server 950 may compare the resolved IPv4 address received in the request message 930 against the IPv4 addresses in the ARP table 955 to determine a match, and may further compare the IP-version-field value received in the request message 930 against the IP-version-field value associated with the IPv4 address that matches the received IPv4 address. When IP-version-field value associated with the matching IPv4 address is determined to include the resolved IP-version-field value, the DHCP server 950 selects the MAC address mapped to the matching IPv4 and sends the response 940 that includes the selected MAC address to the originating host device A 720.

As discussed above, upon receiving the response 940 from the DHCP server 950, the originating host device A 720 may store the MAC address of the destination host device. In an exemplary embodiment, the originating host device A 720 may store the MAC address, IPv4 address, IP-version-field value, and other indicia (e.g., name) of the destination host device as an entry 920 in a host table 910. Because just one device, which is host device B 730 in this example, is referenced in the response 940 as the destination host device, the host table 910 may include less entries than the host table 800 of FIG. 8.

Figure 10:
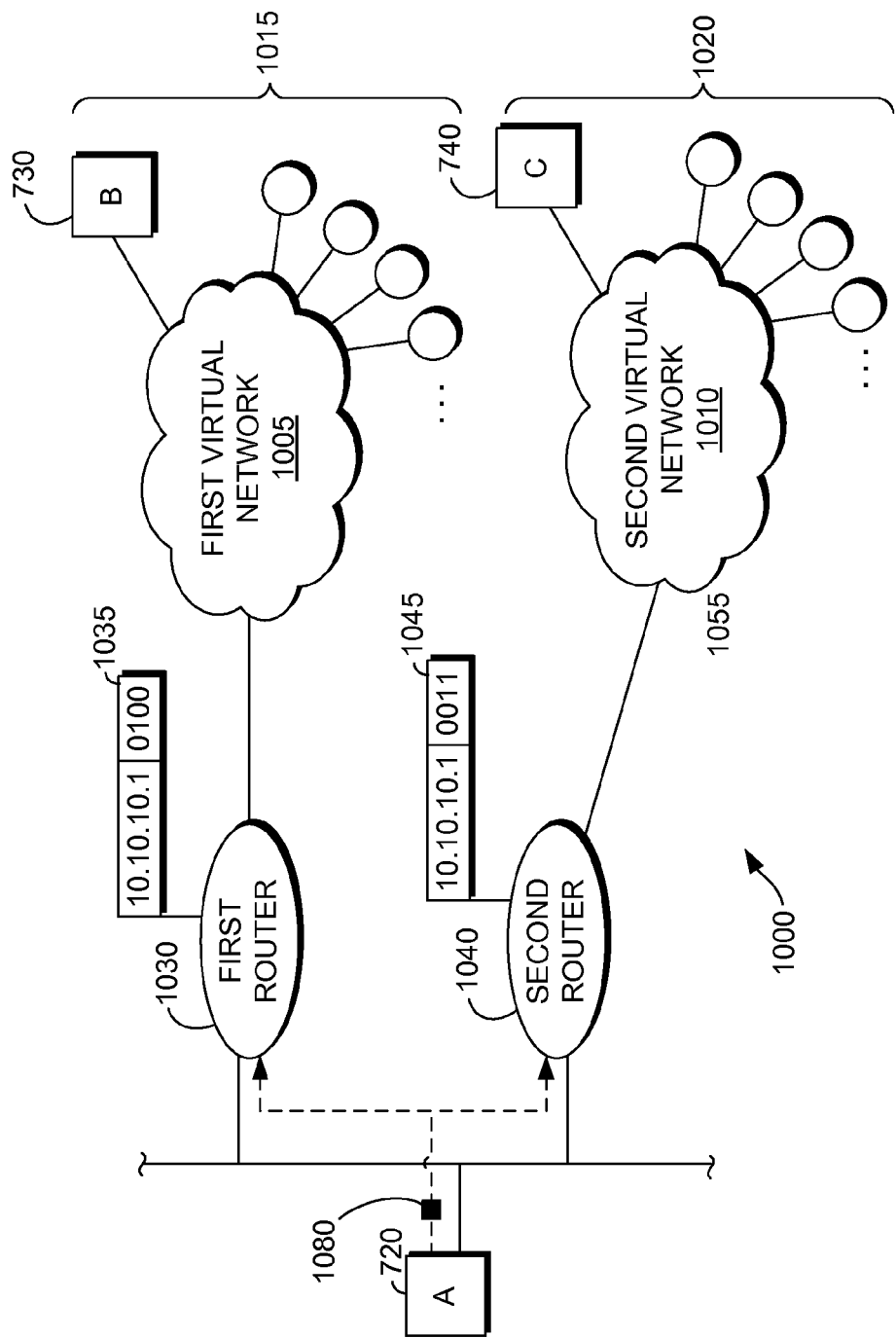
FIGS. 10 and 11 are block diagrams illustrating exemplary system architectures for routing data packets by incorporating a data-link layer address into headers of the data packets, according to embodiments of the present invention.
Figure 11:
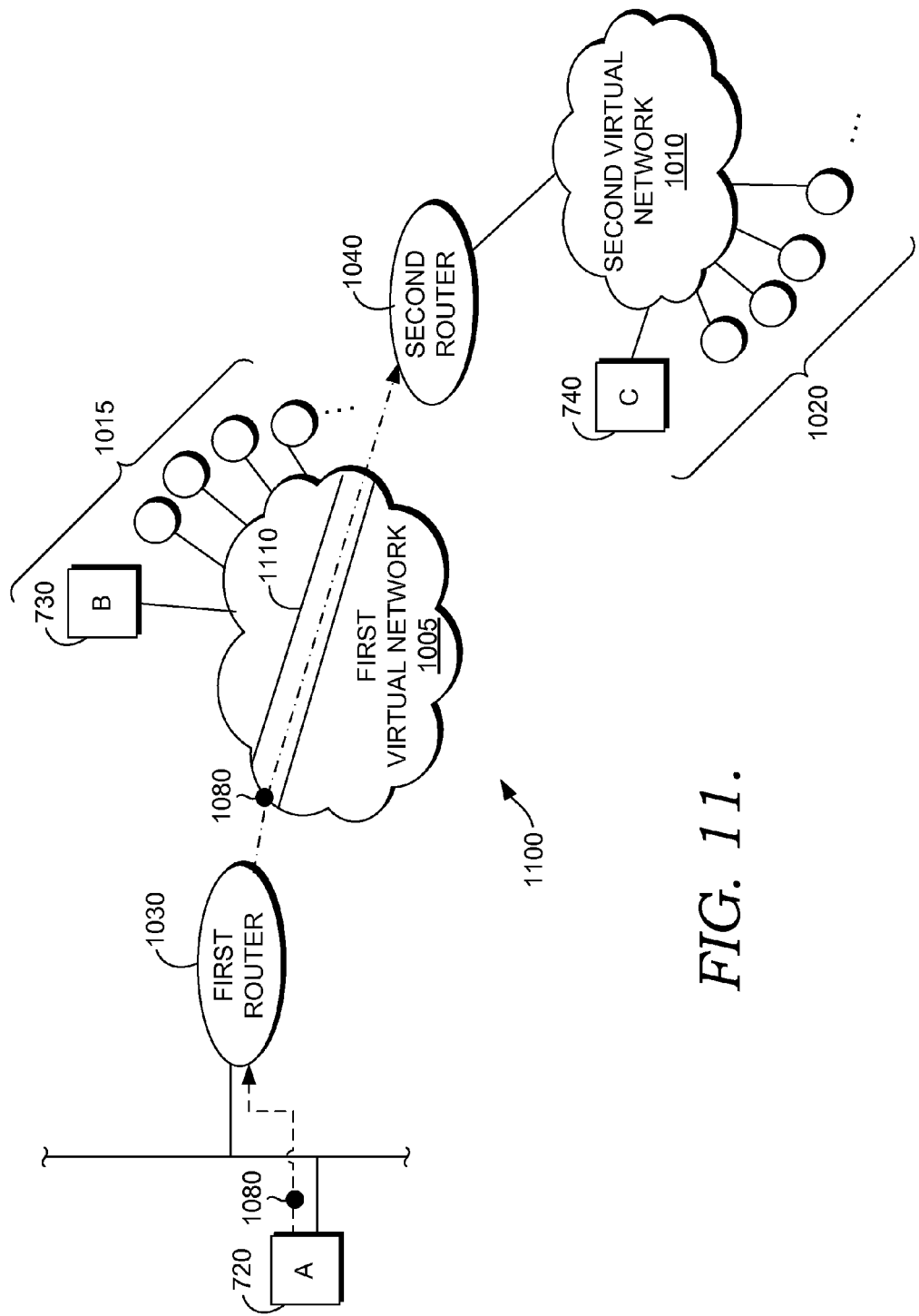

Turning now to FIGS. 10 and 11, block diagrams illustrating exemplary system architectures 1000 and 1100, respectively, for routing data packets 1080 are shown, according to embodiments of the present invention. With reference to FIG. 10, the host device A 720 is depicted sending data packets, represented by reference numeral 1080, within a network, such as a local network or an enterprise network. These data packets 1080 may be received by a first router 1030 and a second router 1040. In the embodiment illustrated in FIG. 10, the routers 1030 and 1040 are interconnected to the host device 720 (originating host device) in parallel. Further, the first router 1030 is assigned a first IP-version-field value "0100" (reference numeral 1035), while the second router 1040 is assigned a second IP-version-field value "0011" (reference numeral 1045). In operation, the first router 1030 serves as a gateway to a first virtual network 1005 that interconnects a plurality of nodes 1015, where the nodes 1015 include the host device B 730. The second router 1040 serves as a gateway to a second virtual network 1010 that interconnects a plurality of nodes 1020, where the nodes 1020 include the host device C 740. In an exemplary embodiment, the nodes 1015 connected via the first virtual network 1005 are assigned fractional IP addresses that include the first value 1035 of the IP version field, while the nodes 1020 connected via the second virtual network 1020 are assigned fractional IP addresses that include the second value 1045 of the IP version field. Accordingly, the network of FIG. 10 is partitioned into the first virtual network 1005 and the second virtual network 1010. Thus, the network is configured to logically or physically segregate the nodes 1015 from the nodes 1020. By way of example, this segregation may be established for reasons of security (i.e., disallowing communication between the nodes 1015 and the nodes 1020).

As discussed above, the data packets 1080 include an IPv4 address and a value of an IP version field that, in combination with the IPv4 address, uniquely identifies a destination host device within the enterprise network. By way of example, the IPv4 address is 12.14.16.3 and the value of the IP version field is 0011. As shown in FIG. 7, the fractional IP address formed by the combination of the example IPv4 address 12.14.16.3 and example IP-version-field value 0011 uniquely identifies the host device B 730 as the destination host device.

Upon receiving the data packets 1080, the routers 1030 and 1040 access respective routing tables associated therewith. In embodiments, these routing tables are populated with a plurality of entries. Typically, one or more of the plurality of entries include IPv4 addresses associated with the particular IP-version-field value assigned to the routers 1030 and 1040, respectively. In embodiments, the routers 1030 and 1040 compare their assigned value of the IP version field against the IP-version-field value received in the data packets 1080 to determine a match. As shown in FIG. 10, the IP-version-field value 1035 assigned to the first router 1030 matches the example value (0100) of the IP version field included in the data packets 1080, while the IP-version-field value 1045 assigned to the second router 1040 is distinct from the example value of the IP version field included in the data packets 1080. In embodiments, when the value of the IP version field in the data packets 1080 matches the value of the IP version field assigned to a router, the router identifies an entry within its associated routing table that references the IPv4 address included in the data packets 1080. In the example above, the first router 1030 would be responsible for inspecting its routing table to identify an entry that includes an IPv4 address that corresponds with the IPv4 address in the data packets 1080.

Upon identifying the entry that includes the IPv4 address that corresponds with the IPv4 address in the data packets 1080, the first router 1030 is then configured to select a MAC address referenced by the identified entry in the routing table. The selected MAC address, in embodiments, may be incorporated within a header of the data packets 1080. Further, the first router 1030 may transmit the data packets 1080, which are routed to the destination host device B 730 based on, in part, the MAC address. Further, upon selecting the MAC address referenced by the identified entry in the routing table, the first router 1030 may send the selected MAC address in a response to the originating host device A 720 for storage in the host table.

With reference to FIG. 11, the originating host device A 720 is depicted if sending the data packets 1080, within a network. These data packets 1080 are be received by the first router 1030 before the second router 1040. In the embodiment illustrated in FIG. 11, the routers 1030 and 1040 are interconnected to the originating host device 720 in series. Further, as discussed in FIG. 10, the first router 1030 is assigned the first IP-version-field value "0100," while the second router 1040 is assigned the second IP-version-field value "0011." As above, the first router 1030 serves as the gateway to the first virtual network 1005, which includes the nodes 1015 and the host device B 730, while second router 1040 serves as the gateway to the second virtual network 1010, which includes the nodes 1020 and the host device C 740.

In operation, if the first IP-version-field value assigned to the first router 1030 matches the value of the IP version field included in the data packets 1080, the first router 1030 attempts to direct the data packets 1080 to one of the nodes 1015 within the first virtual network 1005. However, if the first IP-version-field value is distinct from the value of the IP version field included in the data packets 1080, the first router 1030 may forward the data packets to another router in a series of routers. The determination of which router to forward the data packets 1080 to may be based, in part, on instructions within a forwarding table accessible to the first router 1030. In the exemplary embodiment of FIG. 11, the first router 1030 forwards the data packets 1080 to the second router 1040. In one instance, the data packets 1080 are routed via a tunnel 1110 through the first virtual network 1005; thus, ensuring a secure passage of the data packets 1080 to the second router 1040. Upon the second router 1040 receiving the data packets 1080, the second router 1040 compares the second IP-version-field value assigned thereto against the value of the IP version field included in the data packets 1080. If a match is determined, the second router 1040 attempts to direct the data packets 1080 to one of the nodes 1020 within the second virtual network 1010. Otherwise, the data packets 1080 are forwarded to another router or deleted.

Referring now to FIG. 12, a block diagram illustrating an exemplary system architecture 1200 for routing data packets using a MAC address is shown, according to embodiments of the present invention. Initially, the originating host device A 720 sends out a request message 925 within the local network 705. This request message 925 may be intercepted by an end router 750 if the resolved IPv4 address included within a payload of the request message 925 indicates a host device or a node outside the local network 705. When the resolved IPv4 address in the request message is associated with a host device or a node outside the local network 705, the end router 750 may direct the request message 1225 over network 760 (e.g., WAN) to an end router 1210 that serves as a gateway to a local network 1260. The end router 1210 is selected because an assigned IPv4 address of a node (e.g., host device D 1220, host device E 1230, or host device F 1240) interconnected within the local network 1260 corresponds with the resolved IPv4 address included within the request message 1225.

In one instance, a routing table accessible by the end router 1210 may indicate that one or more of the nodes in the local network 1260 are assigned the same IPv4 address as the resolved IPv4 address carried in the request message 1225. In this instance, the end router 1210 can access and read the routing table upon receiving the request message 1225, compare the resolved fractional IP address within the request message 1225 against entries within the routing table, and direct transmission of the request message 1225 within the local network 1260. As discussed above, directing transmission of the request message 1225 may involve routing the request message 1225 to a plurality of nodes (e.g., host device D 1220, host device E 1230, or host device F 1240) within the local network 1260 in order to solicit a response thereto. Or, in another embodiment, the end router 1210 may direct transmission of the request message 1225 by routing the request message to the DHCP server 1250 connected in the local network 1260.

Turning now to FIG. 12, a flow chart is illustrated that shows an exemplary method 1200 for determining a MAC address upon being solicited by an originating host device, according to an embodiment of the present invention. At some point, data packets are received at a router from an originating host device, as depicted at block 1210. In embodiments, the data packets include an IPv4 address and a resolved value of an IP version field that, in combination with the IPv4 address, uniquely identifies a destination host device within a network, such as a privately owned enterprise network. As depicted at block 1220, a routing table populated with a plurality of entries is accessed by the router receiving the data packets. In embodiments, one or more of the plurality of entries include IPv4 addresses associated with a value of the IP version field assigned to the router. As depicted at block 1230, the resolved value of the IP version field received in the data packets is compared against the assigned value of the IP version field to determine a match. When the resolved value of the IP version field matches the assigned value of the IP version field, an entry within the plurality of entries that references the IPv4 address included in the data packets is identified, as depicted at block 1240. As depicted at block 1250, a MAC address referenced by the identified entry in the routing table is selected. The selected MAC address may be incorporated within a header of the data packets, as depicted at block 1260. Typically, data packets are routed to the destination host device based on, in part, the MAC address.

With reference to FIG. 13, a flow chart is illustrated that shows an exemplary method 1300 for routing one or more data packets within a local network using a MAC address, according to an embodiment of the present invention. Initially, an originating host device may broadcast an ARP request to a plurality of nodes, such as the host devices and the servers described above, connected via the local network, as depicted as block 1310. In an exemplary embodiment, the nodes include the DHCP server, the originating host device, and a destination host device. As more fully described above, the ARP request includes an IPv4 address and a value of an IP version field. As depicted at block 1320, a response to the ARP request is received from the DHCP server or the destination host device. Typically, the response includes a MAC address that identifies the destination host device within the local network and a fractional IP address assigned to the destination host device by the DHCP server. In an exemplary embodiment, the fractional IP address comprises the IPv4 address and the value of the IP version field included in the ARP request. Upon receiving the response, the originating host device may, at least temporarily, write an entry into a host table, as depicted at block 1330. As described above with reference to the host table 800 of FIG. 8, the entry includes the MAC address mapped to the fractional IP address and, in instances, an identifier of the destination host device. As depicted at block 1340 the MAC address may be incorporated into a header of one or more data packets. These data packets are then transmitted from the originating host device to the destination host device, as depicted at block 1350.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

The invention claimed is:

1. A computer system for determining data-link layer addresses of host devices in a local network, the system comprising:
   a dynamic host configuration protocol (DHCP) server that maintains an address resolution protocol (ARP) table and that associates a first fractional IP address to a destination host device and a second fractional IP address to an originating host device,
   wherein the first fractional IP address includes an IPv4 address and a first value of the IP version field,
   wherein the second fractional IP address includes the IPv4 address and a second value of the IP version field; and
   the originating host device that broadcasts a request message to the DHCP server connected via the local network, wherein the request message includes the IPv4 address and a value of an IP version field,
   wherein the DHCP server reads the request message and compares the the first fractional IP address or the second fractional IP address against entries within the ARP table to identify an entry within the ARP table that includes a corresponding IPv4 address and value of the IP version field,
   wherein the DHCP server conveys a response to the request message, and
   wherein the response includes a data-link layer address that is referenced by the identified entry in the ARP table.

2. The computer system of claim 1, further comprising the destination host device that is active on the local network, wherein the IPv4 address in conjunction with the first value of the IP version field uniquely identify the destination host device from other host devices within a plurality of nodes connected via the local network.

3. The computer system of claim 2, wherein the originating host device writes an entry into a host table utilizing the response from the DHCP server, the entry including the data-link layer address mapped to the IPv4 address and the first value of the IP version field assigned to the destination host device.

4. The computer system of claim 3, wherein the originating host device incorporates the data-link layer address into a header of one or more data packets.

5. The computer system of claim 4, wherein the data-link layer address includes a media access control (MAC) address that identifies the destination host device as a node within a plurality of nodes to which the one or more packets are routed.

6. The computer system of claim 5, wherein the DHCP server writes the MAC address of the destination host device and the first fractional IP address assigned to the destination host device to the identified entry within the ARP table.

7. The computer system of claim 4, wherein the destination host device receives the one or more data packets upon transmission from the originating host device.

8. The computer system of claim 1, wherein the request message is formatted as an address resolution protocol (ARP) request.

9. The computer system of claim 1, wherein the originating host device receives an input that identifies a target of the one or more packets to be transmitted from the originating host device.

10. The computer system of claim 9, wherein the originating host device resolves the identified target into the IPv4 address and the first value of the IP version field.

11. The computer system of claim 10, wherein the originating host device utilizes a domain name system (DNS) lookup to perform the resolution of the identified target.

12. A computerized method, employed by a first router and a second router in an enterprise network that is partitioned into at least a first virtual network and a second virtual network, for routing data packets transmitted by an originating host device, the method comprising:
   receiving the data packets from the originating host device, wherein the data packets include an IPv4 address and a resolved value of an IP version field that, in combination with the IPv4 address, uniquely identifies a destination host device within the enterprise network;
   accessing at least one routing table populated with a plurality of entries, wherein one or more of the plurality of entries include IPv4 addresses associated with a first value of the IP version field, which is assigned to the first router that operates as a gateway to a plurality of nodes connected via the first virtual network, and wherein one or more of the plurality of entries include IPv4 addresses associated with a second value of the IP version field, which is assigned to the second router that operates as a gateway to a plurality of nodes connected via the second virtual network;
   when the resolved value of the IP version field matches the first value of the IP version field, identifying a first media access control (MAC) address within the plurality of entries of the at least one routing table associated with the IPv4 address included in the data packets that targets at least one node in the first virtual network;
   when the resolved value of the IP version field matches the second value of the IP version field, identifying a second MAC address within the plurality of entries of the at least one routing table associated with the IPv4 address included in the data packets that targets at least one node in the second virtual network; and
   incorporating the selected first or second MAC address within a header of the data packets, wherein data packets are routed to the destination host device based on, in part, the first or second MAC address.

13. The computerized method of claim 12, further comprising: when the resolved value of the IP version field is distinct from the first value of the IP version field, accessing a forwarding table; determining to transmit the data packets to the second router based, in part, upon reading the forwarding table.

14. The computerized method of claim 13, wherein the plurality of nodes connected via the first virtual network are assigned fractional IP addresses that include the first value of the IP version field, and wherein the plurality of nodes connected via the second virtual network are assigned fractional IP addresses that include a second value of the IP version field.

15. The computerized method of claim 14, wherein determining to transmit the data packets to the second router comprises:
   comparing the resolved value of the IP version field received in the data packets against the second value of the IP version field to ascertain a match;
   when the resolved value of the IP version field matches the second value of the IP version field, identifying within the forwarding table a router that is assigned the second value of the IP version field.

16. One or more non-transitory computer-readable media having computer-executable instructions embodied thereon that, when executed, perform a method for routing one or more data packets within a local network using a media access control (MAC) address, the method comprising:
   broadcasting an address resolution protocol (ARP) request to one or more nodes connected via the local network, wherein the nodes include a dynamic host configuration protocol (DHCP) server, a first device, and a second device, and wherein the ARP request includes an IPv4 address and a value of an IP version field;
   receiving from the DHCP server or the first device a response to the ARP request when the IPv4 address and the IP-version-field value corresponds with an IPv4 address and a first value of the IP version field, respectively, assigned to the first device, wherein the response includes a first MAC address that identifies the first device within the local network and a first fractional IP address assigned to the first device, and wherein the first fractional IP address comprises the IPv4 address and the first value of the IP version field;
   receiving from the DHCP server or the second device a response to the ARP request when the IPv4 address and the IP-version-field value corresponds with an IPv4 address and a second value of the IP version field, respectively, assigned to the second device, wherein the response includes a second MAC address that identifies the second device within the local network and a second fractional IP address assigned to the second device, and wherein the second fractional IP address comprises the IPv4 address and the second value of the IP version field;
   at least temporarily writing an entry into a host table upon receiving the response, wherein the entry includes the first or second MAC address mapped to the first or second fractional IP address, respectively.

* * * * *